(12) United States Patent
Lédeczi et al.

(10) Patent No.: US 7,433,266 B2
(45) Date of Patent: Oct. 7, 2008

(54) ACOUSTIC SOURCE LOCALIZATION SYSTEM AND APPLICATIONS OF THE SAME

(75) Inventors: Ákos Lédeczi, Nashville, TN (US); Miklós Maróti, Szeged (HU); Gyula Simon, Nashville, TN (US); György Balogh, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 328 days.

(21) Appl. No.: 11/227,446

(22) Filed: Sep. 15, 2005

(65) Prior Publication Data

US 2007/0230269 A1 Oct. 4, 2007

Related U.S. Application Data

(60) Provisional application No. 60/610,310, filed on Sep. 16, 2004.

(51) Int. Cl.
*G01S 3/80* (2006.01)
(52) U.S. Cl. .................... 367/129; 367/127; 367/906
(58) Field of Classification Search ............ 367/127, 367/129, 906
See application file for complete search history.

(56) References Cited

U.S. PATENT DOCUMENTS

| 5,504,717 | A | * | 4/1996 | Sharkey et al. | 367/129 |
| 5,930,202 | A | | 7/1999 | Duckworth et al. | |
| 5,973,998 | A | * | 10/1999 | Showen et al. | 367/129 |
| 6,178,141 | B1 | | 1/2001 | Duckworth et al. | |
| 6,847,587 | B2 | * | 1/2005 | Patterson et al. | 367/127 |
| 7,139,222 | B1 | * | 11/2006 | Baxter et al. | 367/129 |

OTHER PUBLICATIONS

Duckworth, G.L. et al., "Fixed and Wearable Acoustic Counter-Sniper Systems for Law Enforcement," *SPIE International Symposium on Enabling Technologies for Law Enforcement and Security*, vol. 3577 (1998).
Gay et al., 2003, The nesC Language: A Holistic Approach to Networked Embedded Systems, *Proc. of PLDI*.
Hill et al., 2000, System Architecture Directions for Networked Sensors, *Proc. of ASPLOS*, 2000.
Lupu et al., 2002, Speaker Verification Rate Study Using the TESPAR Coding Method, *Proc. of COST 276 Workshop on Information and Knowledge Management for Integrated Media Communication*.

(Continued)

*Primary Examiner*—Ian J Lobo
(74) *Attorney, Agent, or Firm*—Morris, Manning & Martin LLP; Tim Tingkang Xia (57) ABSTRACT

A system for locating an acoustic source from an acoustic event of the acoustic source. In one embodiment, the system includes a sensor network having a plurality of spatially separated sensor nodes each located in a predetermined position encountering acoustic waves generated by an acoustic event passing proximate to the plurality of spatially separated sensor nodes, where the plurality of spatially separated sensor nodes are synchronized to a common time base such that when the acoustic event is detected, information of the acoustic waves from each of the plurality of spatially separated sensor nodes is obtained and broadcasted through the sensor network. The system further includes a base station for receiving information of the acoustic waves broadcasted from the sensor network and processing the received information of the acoustic waves so as to locate the acoustic source of the acoustic event.

10 Claims, 7 Drawing Sheets

OTHER PUBLICATIONS

Mahajan and Walworth 2001, 3-D Position Sensing Using the Differences in the Time-of-Flights from a Wave Source to Various Receivers, *IEEE Transactions On Robotics and Automation*, vol. 17, No. 1, pp. 91-94.

Maroti et al., 2004, Flooding Time Synchronization, *Technical Report*, Institute for Software Integrated Systems, Vanderbilt University.

Maroti, 2004, Directed Flood-Routing Framework, *Technical Repor*, Institute for Software Integrated Systems, Vanderbilt University.

Stoughton, 1997, Measurements of Small Caliber Ballistic Shock Waves in Air, *JASA* 102 (2), Part 1.

Vick et al., 2000, Aerospace Operations in Urban Environments: Exploring New Concepts, *RAND* MR-1187.

* cited by examiner

ACOUSTIC SOURCE LOCALIZATION SYSTEM AND APPLICATIONS OF THE SAME

CROSS-REFERENCE TO RELATED PATENT APPLICATION

This application claims the benefit, pursuant to 35 U.S.C. §119(e), of U.S. provisional patent application Ser. No. 60/610,310, filed Sep. 16, 2004, entitled "AN ACOUSTIC SOURCE LOCALIZATION SYSTEM AND APPLICATIONS OF THE SAME," by Akos Ledeczi, Miklos Maroti, Gyula Simon and Gyorgy Balogh, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [9] represents the $9^{th}$ reference cited in the reference list, namely, Maroti, 2004, Directed Flood-Routing Framework, *Technical Report*, Institute for Software Integrated Systems, Vanderbilt University.

STATEMENT OF FEDERALLY-SPONSORED RESEARCH

The present invention was made with Government support under a contract 733615-01-C-1903 awarded by Defense Advanced Research Projects Agency (DARPA). The United States Government may have certain rights to this invention pursuant to these grants.

FIELD OF THE INVENTION

The present invention is generally related to source localization, and in particular, is related to the utilization of an acoustic source localization system to locate an acoustic source from an acoustic event of the acoustic source.

BACKGROUND OF THE INVENTION

Acoustic source localization is a well-studied problem. A special case of such a problem is shooter detection and localization. There are many countersniper systems available. However, their performance in urban environments is usually unsatisfactory. For the countersniper systems that measure phenomena associated with the ejection of a bullet from a gun, such as a muzzle blast or a muzzle flash, they require a direct line of a site to the gun shooter. This significantly limits the coverage efficiency in a dense urban terrain. For the countersniper systems that detect the projectile and try to reconstruct the trajectory, they are typically accurate in their bearing detection, but not as much as in their range estimation. Furthermore, the environmental conditions associated with active warfare, or even typical peacetime urban noise, aggravate the problem.

The majority of sniper detection systems are acoustic related and most of them measure both a muzzle blast and a shock wave [77]. The ballistic shock wave is a sonic boom generated by a supersonic projectile, and has a specific wave shape based on a diameter and a length of the projectile itself, a distance from the flight path along with the velocity of the projectile [6]. A shock wave form generated by the flight of a projectile is called an N-wave, due to its characteristic shape.

A bullet ears system of BBN Technologies, Cambridge, Mass., measures the time of arrival of a shock wave along with its basic characteristics which enables the estimation of the caliber, the speed and trajectory of the projectile using two small arrays of inexpensive microphones [1]. The bullet ears system also detects a muzzle blast to estimate the range of a shooter. Utilizing two microphone arrays it estimates the origin of the shot within ±2° in bearing and ±10% in range depending on the distance between the two arrays versus the firing range.

All of the conventional systems, either acoustic or others, share one common characteristic. They do not perform well in urban environments. These systems are all centralized in the sense that they rely on a small number of sensors or small sensor arrays, typically one or two. If some of the limited number of sensors do not have direct line of sight, they will not detect the shot. In case of the acoustic systems, the problem becomes much harder due to multi-path effects. Instead of missing a shot, they may pick up echoes resulting in an erroneous location estimate.

Therefore, a heretofore unaddressed need exists in the art to address the aforementioned deficiencies and inadequacies.

SUMMARY OF THE INVENTION

The present invention, in one aspect, relates to a system for locating an acoustic source from an acoustic event of the acoustic source. The acoustic wave comprises a shock wave. In one embodiment, the system has a sensor network and a base station. The sensor network has a plurality of spatially separated sensor nodes. Each spatially separated sensor node is located in a predetermined position encountering acoustic waves generated by an acoustic event passing proximate to the plurality of spatially separated sensor nodes. The plurality of spatially separated sensor nodes of the sensor network are synchronized to a common time base such that when the acoustic event is detected, information of the acoustic waves from each of the plurality of spatially separated sensor nodes is obtained and broadcasted through the sensor network. The information of the acoustic waves includes the time of arrival of the acoustic waves at the corresponding sensor node. The base station is adapted for receiving information of the acoustic waves broadcasted from the sensor network and processing the received information of the acoustic waves so as to locate the acoustic source of the acoustic event. In one embodiment, the base station comprises a computer. The system further includes a middleware service for synchronizing the plurality of spatially separated sensor nodes of the sensor network and routing message through the sensor network.

In one embodiment, the plurality of spatially separated sensor nodes communicates each other wirelessly. Each of the plurality of spatially separated sensor nodes comprises a mote and an acoustic sensor board in communication with the mote, where the acoustic sensor board comprises at least one acoustic sensor.

In another aspect, the present invention relates to a method for locating an acoustic source from an acoustic event of the acoustic source. The acoustic wave comprises a shock wave. In one embodiment, the method comprises the step of deploying a sensor network having a plurality of spatially separated sensor nodes, each spatially separated sensor node having a unique node ID and located in a predetermined position encountering acoustic waves generated by an acoustic event passing proximate to the plurality of spatially separated sensor nodes. In one embodiment, each of the plurality of spatially separated sensor nodes comprises a mote and an acoustic sensor board in communication with the mote, wherein the acoustic sensor board comprises at least one acoustic sensor. The plurality of spatially separated sensor nodes communicates each other wirelessly.

The method further comprises the step of synchronizing the plurality of spatially separated sensor nodes of the sensor network to a common time base. In one embodiment, the synchronizing step is performed with a flooding time synchronization protocol. The flooding time synchronization protocol comprises the steps of (a) electing a node from the plurality of spatially separated sensor nodes as a root node at starting time of the sensor network to which the rest of the plurality of spatially separated sensor nodes will be synchronized, (b) periodically broadcasting a message by the root node to nodes within a broadcast radius of the root node, the message containing a root ID, a sequence number and a time stamp, the root ID being the unique node ID of the root node, the sequence number being a monotonically increased unique ID generated by the root node, the time stamp being the globe time known by the root node at the time of message transmission, (c) recording its own local time when receiving the broadcasted message so as to have a reference point with an estimate of the global time along with its own local time for each of the nodes within the broadcast radius of the root node if the sequence number for the broadcasted message is higher than the highest sequence number stored in a reference table in the corresponding node, (d) synchronizing each of the nodes by updating its reference table with the reference point, and the sequence number and the current root ID, (e) re-broadcasting the message using its highest sequence number and the current root ID by the synchronized node to nodes within a broadcast radius of the synchronized node so as to synchronize the nodes, (f) repeating steps (b)-(e) to synchronize the sensor network to the root node, and (g) re-electing a root node if a node does not received a message for a predetermined period of time.

Moreover, the method comprises the step of obtaining information of the acoustic waves from each of the plurality of spatially separated sensor nodes when the acoustic event is detected, the information of the acoustic waves including the time of arrival of the acoustic waves at the corresponding sensor node.

Furthermore, the method comprises the step of broadcasting the obtained information of the acoustic waves from each of the plurality of spatially separated sensor nodes through the sensor network to a base station. In one embodiment, the broadcasting step is performed with a directed flood-routing framework engine. The directed flood-routing framework engine performs the steps of creating a flooding policy that defines a direction of flooding and a way of which intermediate neighboring nodes re-broadcast messages, keeping recently received data packets in a table together with their priority that is managed by the flooding policy, periodically selecting the data packets with the highest priority, packing the selected data packets into a single radio message, and broadcasting the packed data packets to the neighboring nodes.

Additionally, the method comprises the steps of receiving the broadcasted information of the acoustic waves from the sensor network by the base station, and processing the received information of the acoustic waves so as to locate the acoustic source of the acoustic event in the base station. In one embodiment, the processing step is performed with a sensor fusion algorithm. The sensor fusion algorithm comprises the steps of defining a consistency function from the obtained information of the acoustic waves and positions of the corresponding sensor nodes finding a maximum of the consistency function, and identifying a location of the maximum of the consistency function as the location of the acoustic source of the acoustic event. The consistency function is configured such that the consistency function automatically classifies and eliminates erroneous measurements and multi-path effects.

In another aspect, the present invention relates to a system for locating an acoustic source from an acoustic event of the acoustic source. In one embodiment, the system has a sensor network having a plurality of spatially separated sensor nodes, each spatially separated sensor node having a unique node ID and located in a predetermined position encountering acoustic waves generated by an acoustic event passing proximate to the plurality of spatially separated sensor nodes, means for synchronizing the plurality of spatially separated sensor nodes of the sensor network to a common time base, means for obtaining information of the acoustic waves from each of the plurality of spatially separated sensor nodes when the acoustic event is detected, the information of the acoustic waves including the time of arrival of the acoustic waves at the corresponding sensor node, means for broadcasting the obtained information of the acoustic waves from each of the plurality of spatially separated sensor nodes through the sensor network, and a base station for receiving information of the acoustic waves broadcasted from the sensor network and processing the received information of the acoustic waves so as to locate the acoustic source of the acoustic event. In one embodiment, the base station runs a sensor fusion algorithm to process the received information of the acoustic waves.

In one embodiment, the means for synchronizing the plurality of spatially separated sensor nodes of the sensor network comprises a flooding time synchronization protocol, the means for broadcasting the obtained information of the acoustic waves from each of the plurality of spatially separated sensor nodes through the sensor network comprises a directed flood-routing framework engine.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 1 shows schematically (a) a system architecture according to one embodiment of the present invention, and (b) an acoustic event generated by a gunshot.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings FIGS. 1-6, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them.

For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "synchronization" refers to coordination with respect to time of two or more events.

Overview of the Invention

Figure 1A:
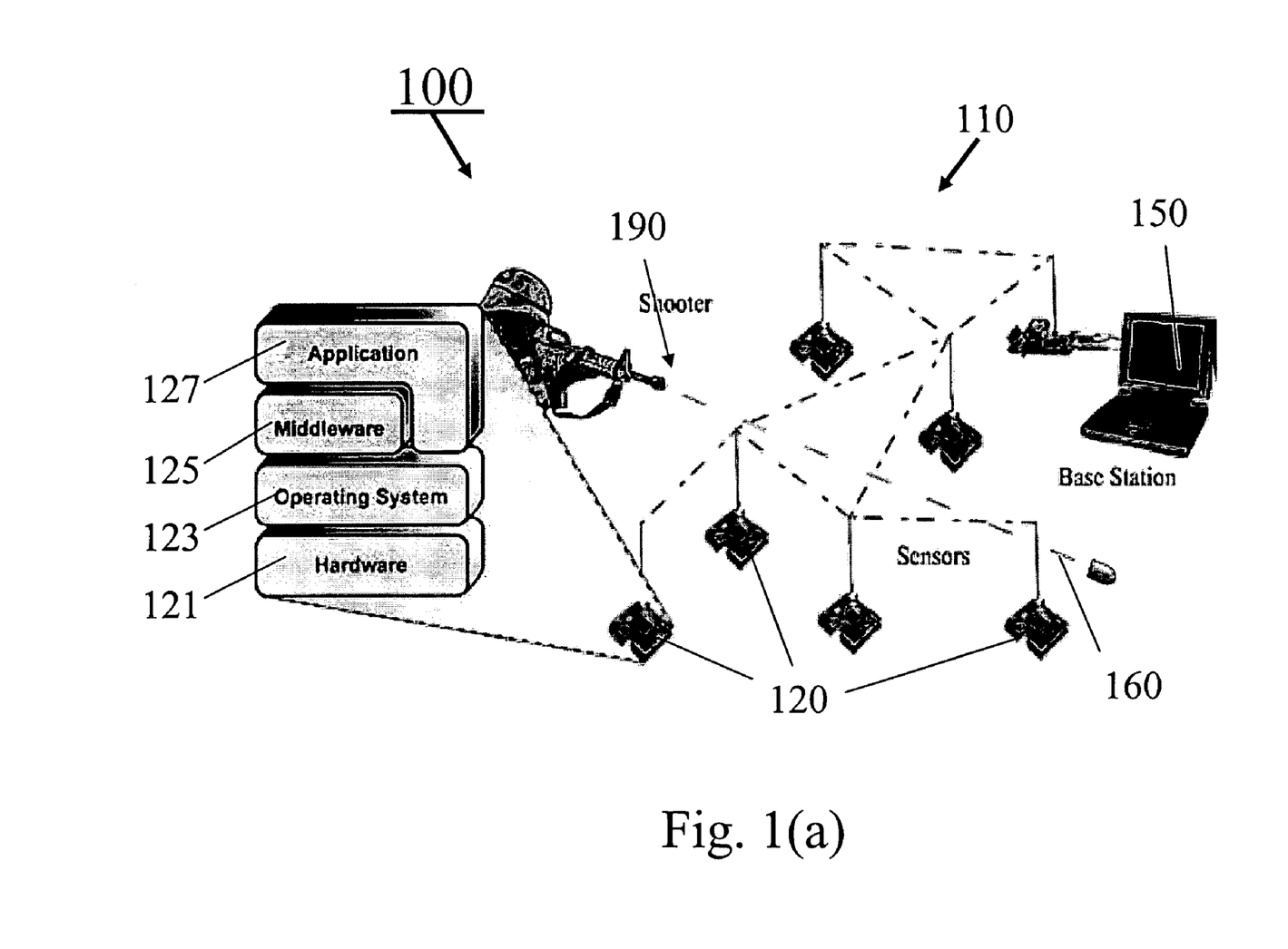
Figure 1B:
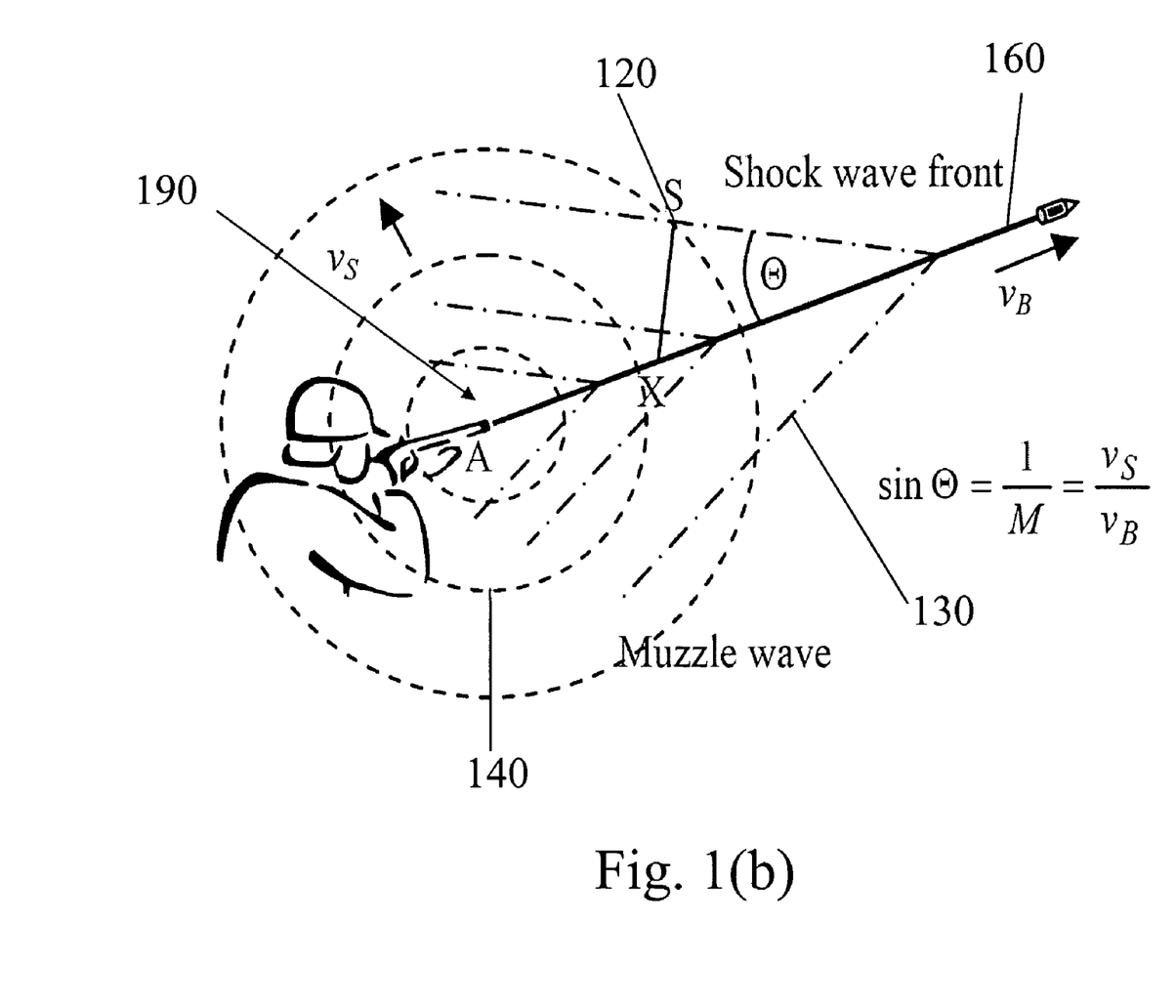

The present invention, in one aspect, relates to a system for locating an acoustic source from an acoustic event of the acoustic source. Referring in general to FIGS. 1(a) and 1(b), and particularly to FIG. 1(a) first, a system 100 for locating an acoustic source 190 from an acoustic event 160 of the acoustic source 190 is shown according to one embodiment of the current invention. One example of the acoustic event 160 is an event of a gunfire (gunshot) 160. The acoustic event 160 can also be an explosion, a combination of a gunfire and an explosion, or the like. The acoustic wave includes a shock wave 130 and a muzzle blast 140 for the gunfire, as shown in FIG. 1(b). In this embodiment, the system 100 has a sensor network 110 and a base station 150. The sensor network 110 has a plurality of spatially separated sensor nodes 120. Each sensor nodes 120 has a unique identity (hereinafter "ID") and is located in a predetermined position encountering acoustic waves generated by the acoustic event 160 passing proximate to the plurality of spatially separated sensor nodes 120. Each of the plurality of spatially separated sensor nodes 120 includes a mote and an acoustic sensor board that is in communication with the mote. The acoustic sensor board has at least one acoustic sensor. In one embodiment, the plurality of spatially separated sensor nodes communicates each other wirelessly. The plurality of spatially separated sensor nodes 120 of the sensor network 110 are synchronized to a common time base such that when the acoustic event 160 is detected, information of the acoustic waves from each of the plurality of spatially separated sensor nodes 120 is obtained and broadcasted through the sensor network 110 to a base station 150. The information of the acoustic waves includes the time of arrival of the acoustic waves at the corresponding sensor node. The base station 150 is adapted for receiving information of the acoustic waves broadcasted from the sensor network and processing the received information of the acoustic waves so as to locate the acoustic source of the acoustic event 160. In one embodiment, the base station comprises a computer. The system 100 further includes a middleware service 125 for synchronizing the plurality of spatially separated sensor nodes 120 of the sensor network 110 and routing message through the sensor network 110. Additionally, the system 100 includes a hardware layer 121, an operating system 123, and application related components 127 that, together with the middleware service 125, are incorporated into each the plurality of spatially separated sensor nodes 120.

Figure 6:
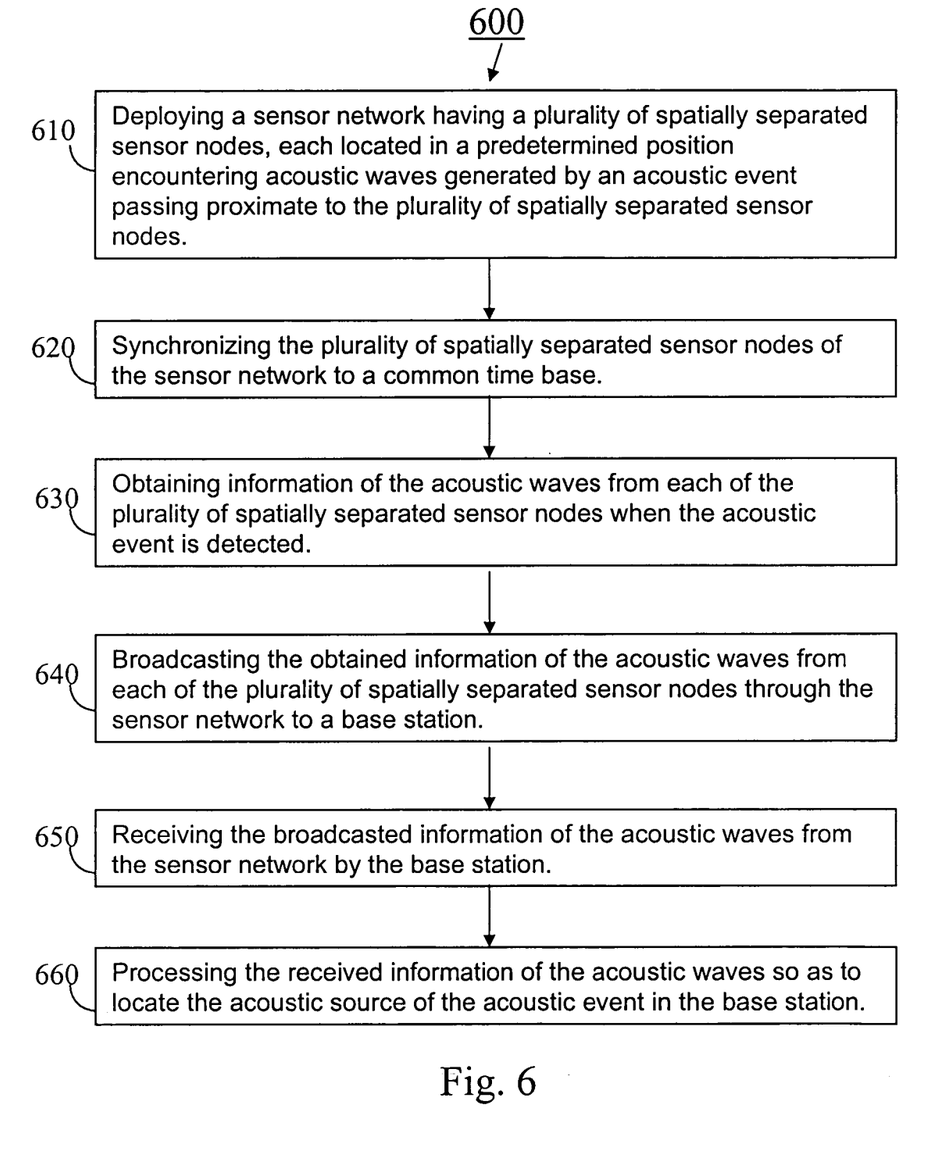
FIG. 6 shows a flow chart of a method for locating an acoustic source from an acoustic event of the acoustic source according to one embodiment of the present invention.

Referring to FIG. 6, a flow chart of a method for locating an acoustic source from an acoustic event of the acoustic source is shown according to one embodiment of the present invention. The method 600 in this embodiment includes the following steps: at step 610, a sensor network having a plurality of spatially separated sensor nodes is deployed. Each spatially separated sensor node has a unique node ID and is located in a predetermined position encountering acoustic waves generated by an acoustic event passing proximate to the plurality of spatially separated sensor nodes.

At step 620, the plurality of spatially separated sensor nodes of the sensor network is synchronized to a common time base. In one embodiment, the synchronizing step 620 is performed with a flooding time synchronization protocol. The flooding time synchronization protocol includes the steps of (a) electing a node from the plurality of spatially separated sensor nodes as a root node at starting time of the sensor network to which the rest of the plurality of spatially separated sensor nodes will be synchronized, (b) periodically broadcasting a message by the root node to nodes within a broadcast radius of the root node, the message containing a root ID, a sequence number and a time stamp, the root ID being the unique node ID of the root node, the sequence number being a monotonically increased unique ID generated by the root node, the time stamp being the globe time known by the root node at the time of message transmission, (c) recording its own local time when receiving the broadcasted message so as to have a reference point with an estimate of the global time along with its own local time for each of the nodes within the broadcast radius of the root node if the sequence number for the broadcasted message is higher than the highest sequence number stored in a reference table in the corresponding node, (d) synchronizing each of the nodes by updating its reference table with the reference point, and the sequence number and the current root ID, (e) re-broadcasting the message using its highest sequence number and the current root ID by the synchronized node to nodes within a broadcast radius of the synchronized node so as to synchronize the nodes, (f) repeating steps (b)-(e) to synchronize the sensor network to the root node, and (g) re-electing a root node if a node does not received a message for a predetermined period of time.

At step 630, information of the acoustic waves from each of the plurality of spatially separated sensor nodes is obtained when the acoustic event is detected. The obtained information of the acoustic waves including the time of arrival of the acoustic waves at the corresponding sensor node.

At step 640, the obtained information of the acoustic waves from each of the plurality of spatially separated sensor nodes is broadcasted through the sensor network to a base station. In one embodiment, the broadcasting step 640 is performed with a directed flood-routing framework engine. The directed flood-routing framework engine performs the steps of creating a flooding policy that defines a direction of flooding and a way of which intermediate neighboring nodes re-broadcast messages, keeping recently received data packets in a table together with their priority that is managed by the flooding policy, periodically selecting the data packets with the highest priority, packing the selected data packets into a single radio message, and broadcasting the packed data packets to the neighboring nodes.

At step 650, the broadcasted information of the acoustic waves from the sensor network is received by the base station. And at step 660, the received information of the acoustic waves is processed so as to locate the acoustic source of the acoustic event in the base station. In one embodiment, the processing step 660 is performed with a sensor fusion algorithm. The sensor fusion algorithm includes the steps of defining a consistency function from the obtained information of the acoustic waves and positions of the corresponding sensor nodes finding a maximum of the consistency function, and identifying a location of the maximum of the consistency function as the location of the acoustic source of the acoustic event. The consistency function is configured such that the consistency function automatically classifies and eliminates erroneous measurements and multi-path effects.

Additional examples and aspects of the present invention are given below in details.

Implementation and Examples of the Invention

Without intent to limit the scope of the invention, further exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

System Architecture

Referring back to FIG. 1a, the system 100 according to one embodiment of the present invention utilizes an ad hoc wireless network 110 of inexpensive acoustic sensors. The wireless network 110 has a plurality of sensor nodes 120 that measure a shock wave and a muzzle blast associated with a gunshot (gunfire) 160 from an acoustic source 190 (a shooter with gun) and propagate the measured results back to a base station 150. The base station 150 including one or more PC computers or other processors runs a sensor fusion algorithm and acts as a primary user interface. Optionally, one or more personal digital assistant (hereinafter "PDA") devices may act as secondary user interfaces. In one embodiment, the PDA gets data from the base station through the wireless network 110.

The system 100 of the present invention running on individual nodes 120 has a traditional layered architecture 121 as shown in FIG. 1a. The hardware layer 121 is built upon a MICA mote platform. In one embodiment, MICA2 mote platform [3], a commercial off-the-shelf (hereinafter "COTS") sensor node from Crossbow Technology, Inc., San Jose, Calif., is employed. The MICA2 mote includes a 7.3 MHz 8-bit At-mel ATmega 128L low power microcontroller, a 433 MHz Chipcon CC1000 multi-channel transceiver with a 38.4 kbps transfer rate and a maximum practical range of about 100 meters, 4 KB RAM and a 128 KB flash memory. The MICA2 mote also has an extension interface that may be used to connect various sensor boards containing photo, temperature, humidity, pressure sensors, accelerometers, magnetometers and microphones. The MICA2 mote is powered with two AA batteries. Other types of motes can also be used to practice the present invention.

The MICA2 mote platform is operated with an operating system 123. In one embodiment, the operating system 123 includes a TinyOS operating system developed by University of California at Berkeley [2]. The TinyOS is a component-based configurable operating system with a very small memory footprint that is specifically designed for resource limited devices such as sensor nodes in a sensor network [3]. The TinyOS provides a large set of software components implementing basic functionalities that an application might need, which include services, such as basic I/O, timers, and wireless communication. Components may contain other components in a hierarchical fashion. Each application includes application-specific components written by a user and a subset of the TinyOS components. In this way, an application-specific TinyOS instance is created for each application providing only the services it actually needs, which conserves system resources. Other operating systems can also be employed to practice the present invention.

Middleware Services

There are several unique constraints on the existing middleware services in a target hardware platform. For example, in order to correlate individual measurements, the clocks of the sensor nodes of the sensor network need to be synchronized. The overall localization error caused by imperfect time synchronization is required to be less than one foot. Since the sound travels approximately one foot per millisecond in air, a multi-hop time synchronization algorithm with an error of less than one millisecond is needed. Additionally, the middleware services run on the severely resource limited MICA2 motes. As described below in details, a flooding time synchronization protocol (hereinafter "FTSP") [8] can be applied to overcome the obstacles of the existing middleware services, which provides an average error of less than 2 μs per hop.

In addition to accuracy requirements, the real-time performance of the system is also required. The overall latency of the system, that is the time from a detection of a gunshot until the display of an estimated shooter position on a user interface, needs to be less than about two seconds. Experiments show that for accurate position estimation in the presence of multi-path effects, about 7-8 good line of sight measurements are required. In one embodiment, the sensor nodes of the sensor network with a maximum distance from the base station are 5 hops away. The effective bandwidth between two motes under ideal circumstances is no more than 800 bytes per second which transmits about 20-25 messages per second. However, the most challenging characteristic of the application is the bursty nature of communications. If two or more motes detect a shot at approximately the same time and send their data right away, this data transmission may saturate the available bandwidth of the sensor network. The present invention discloses a directed flood-routing framework (hereinafter "DFRF") that is able to achieve the real-time performance.

Time Synchronization

The FTSP is designed to address problems arising in multi-hop dynamic networks: scalability, robustness and fast convergence. The scalability issue is of crucial importance in sensor networks, where hundreds or even thousands of sensor nodes are deployed, hereby forming a multi-hop ad-hoc sensor network. As described below, the FTSP algorithm is robust to maintain network connectivity even when the network topology changes, the network nodes move, break or die. The FTSP algorithm is able to converge fast to a global synchronized state shortly after the startup of the sensor network. Also, the FTSP algorithm enables each sensor node to tell whether its clock is synchronized or not.

In one embodiment, the FTSP algorithm utilizes periodic broadcast messages to obtain time synchronization reference points between a sender and its neighbors. The synchronization process exploits multiple reference points to compensate differences in clock times and clock frequencies (skew) as well. After convergence the whole network is synchronized to an elected leader node with all nodes having a good estimate of the global time. The FTSP algorithm is robust against topology changes and node failures The reference points for time synchronization are obtained by message broadcasting. A sender that is assumed to be already synchronized sends the synchronization broadcast message containing the global time known by the sender at the time of message transmission. Thus, the message contains its own sending time, which may be very different from the message posting time. This delay is random and mainly caused by a medium access control (hereinafter "MAC") layer protocol of the TinyOS, which controls the radio channel access and provides collision avoidance. To avoid large uncertainties resulting from the varying access time, time stamping is performed when the first byte of the message is being transmitted. The receiver records its own local time after the arrival of the first byte. Thus the receiver has a reference point with an estimate of the global time along with its corresponding own local time stamp. The reference points are stored in a Reference Table used to estimate the clock skew.

A single reference point is sufficient to determine an offset between the broadcasted global time and the local time, and to synchronize the clocks of two nodes with the very same clock frequency. For conventional hardware, however, the significant clock skew necessitates very frequent resynchronization to maintain the required accuracy, which undesirably increases the sensor network load and power consumption. The invented algorithm practically eliminates the error resulting from different clock frequencies by estimating and correcting the clock skews. The estimation on each mote is based upon the Reference Table containing reference points that are obtained from the received synchronization messages. Whenever a new message arrives and the Reference Table contains enough consistent reference points, both the clock offset and the skew are estimated by linear regression, and the sensor node declares itself being synchronized. The global time estimate on each node is the local time that is modified by the estimated offset and skew values. Each synchronized node periodically broadcasts time synchronization messages with its own global time estimate.

The sensor network is ultimately synchronized to one specific node, called the root that is dynamically elected. In a connected network there is one root, except for short transient periods, when there may temporarily be zero or multiple roots in the system. If a node is in the broadcast radius of the root then it collects reference points directly from the root. Since all synchronized nodes broadcast synchronization messages, nodes outside the broadcast radius of the root gather reference points indirectly from other nodes that are located closer to the root.

Each synchronization message contains a root ID, a sequence number and a time stamp. The root ID is the unique node ID of the current root as known by the sender of the message. The sequence number is a monotonically increasing unique ID generated by the root and forwarded by other synchronized nodes. A received synchronization message is considered to be a new message at a node if (1) the root ID in the message is the same as the root ID known by the node and the sequence number is higher than the highest sequence number received so far by the node, or (2) the root ID is smaller than the root ID known by the node. After receiving a new synchronization message the node adds the reference point to its Reference Table and updates the highest sequence number and the current root ID variables.

The root periodically broadcasts time synchronization messages, which, in addition to the time stamp, contain the monotonically increasing sequence number and the node ID of the root. After receiving a synchronization message the nodes update their Reference Tables and eventually become synchronized. Every synchronized node periodically broadcasts synchronization messages, using its highest sequence number and current root ID.

The root is elected sooner after the startup of the network and a new root is dynamically elected in case of a root failure. The election procedure is based upon unique node IDs and the sequence numbers. Whenever a node does not receive new time synchronization messages for a certain period of time then it declares itself to be the root. If a root receives a time synchronization message with a smaller root ID than its own ID then it gives up its root status. Thus, if two or more roots exist in a connected network then the one with the smallest node ID will eventually become the single root and the others will synchronize themselves to the winner.

In one embodiment, the FTSP algorithm was implemented on MICA2 motes and the performance was evaluated in a network containing 64 motes distributed along an 8×8 grid, where the distance from the root to the farthest mote was 7 hops. Every mote sent one synchronization message per 30 seconds. An extensive 160-minute evaluation was performed including randomly switching off and on nodes, switching off and on half of the motes at the same time, and switching off the root. The whole network converged in approximately 10 minutes after startup, such that the average synchronization error was about 18 microseconds (i.e. about 1.7 microseconds per hop). The maximum error in the network was about 38 microseconds, which occurred after the root was switched off.

Message Routing

In one embodiment, a DFRF is built on an engine that manages the routing of messages on all nodes in the sensor network [9]. Application components using the flood-routing engine send and receive regular sized data packets according to an interchangeable flooding policy. The flooding policy specifies the "direction" of flooding and how intermediate nodes rebroadcast messages. The DFRF engine keeps the recently received data packets in a table together with their priority which is managed by the policy, periodically selects the data packets with the highest priority, packs them into a single radio message and broadcasts it to the neighboring nodes.

Specifically, when the DFRF engine broadcasts or re-broadcasts a radio message, it does not include the current node ID in the message, but a policy dependent value, called the rank of the node. The rank of the node describes the progress of a data packet in a policy-dependent way, and is used to determine what to do with incoming data packets. For the DFRF engine the rank is simply an array of bytes passed to the flooding policy when a data packet arrives. Note that the rank does not depend on the data packet, thus the single rank value is used for multiple aggregated data packets. For the converge-cast policy disclosed in the invented system, the node rank is a hop-count distance from the root.

Apart from defining the rank of nodes, the flooding policy has a primary role of governing the data packet lifecycle at each node. The lifecycle of a particular data packet is a finite state machine. There are two types of states: one is corresponding to a state in which the data packet is eligible for retransmission, and the other is corresponding to a state in which the data packet must be remembered but should not be retransmitted. For example, if an intermediate node retransmits a data packet and then receives the same data packet from a node that is closer to the target than itself, then the data packet should not be retransmitted. However, the node must remember the data packet to prevent retransmitting the same data packet in case it receives it later from a node further from the target than itself.

The DFRF engine maintains a table of data packets and their current states. Each state is associated with a unique priority. The DFRF engine has three basic activities: broadcasting and receiving radio messages, and aging data packets in the table. When a message is sent, the engine calculates the new state based on the policy for each data packet contained in the message. Then it packs the highest priority transmittable messages into a radio message buffer. The DFRF engine stops sending messages if there are no more transmittable data packets in the table.

When a new radio message is received, the engine unpacks each contained data packet. For each data packet it looks for a match in the table. If no match is found, it places it in an available slot. If the table is full then the data packet with the lowest priority is evicted. This evicted data packet is overwritten by a newly arrived data packet with a maximum priority. Finally, the DFRF engine periodically ages all valid data packets in the table by executing the next step in the data packet life-cycle state machine defined by the flooding policy.

In one embodiment of the present invention, a converge-cast policy is implemented. Similar to gradient-based routing schemes, the algorithm utilizes its estimated distance from the base station. The base station initializes a gradient estimation by sending flooding broadcast messages to the network. Each sensor records the hop-count from the base station to itself when a message is received for the first time, and then rebroadcasts the message. Using multiple flooding broadcasts, the average of these hop-count measurements provides a good estimate of the distance from the base station. Furthermore, the flooding policy is fine tuned to deliver as many messages as possible to the base station in the first second. Then, in a more reliable, but slower second phase, most of the remaining sensor readings are delivered. In one embodiment, the approach was performed on a 60-mote system with a diameter of 10 hops. Results indicated that about 12-15 messages were reliably received in the first second.

Signal Detection

In one embodiment, a sensor board having a MICA2 mote has three independent acoustic channels and three microphones located exactly 2 inches from each other and associated with the three acoustic channels, respectively. In addition to the three acoustic channels, the sensor board has a Xilinx Spartan II Field Programmable Gate-Array (hereinafter "FPGA"), (Xilinx, Co., San Jose, Calif.). The FPGA chip implements signal processing algorithms and the I$^2$C interface to the MICA2 mote. The on-board processing capability is necessary since the Atmel microcontroller on the MICA2 mote does not have enough computing power. The FPGA draws more current than the MICA2 mote is able to provide, therefore, the sensor board may have its own power source.

The incoming raw acoustic signal, such as a shock wave and muzzle blast detection data, is compressed using zero-crossing (hereinafter "ZC") coding. ZC is a widely used technique in speech recognition [4], which uses a comparator with a deadband around zero to code intervals between zero-crossings by storing the start time of the interval, the length of the interval, the minimum or maximum signal value, the previous signal average amplitude and the rise time of the signal. Both the shock wave and the typical muzzle blast have characteristic ZC signatures that the detectors look for in the noisy data.

Figure 2:
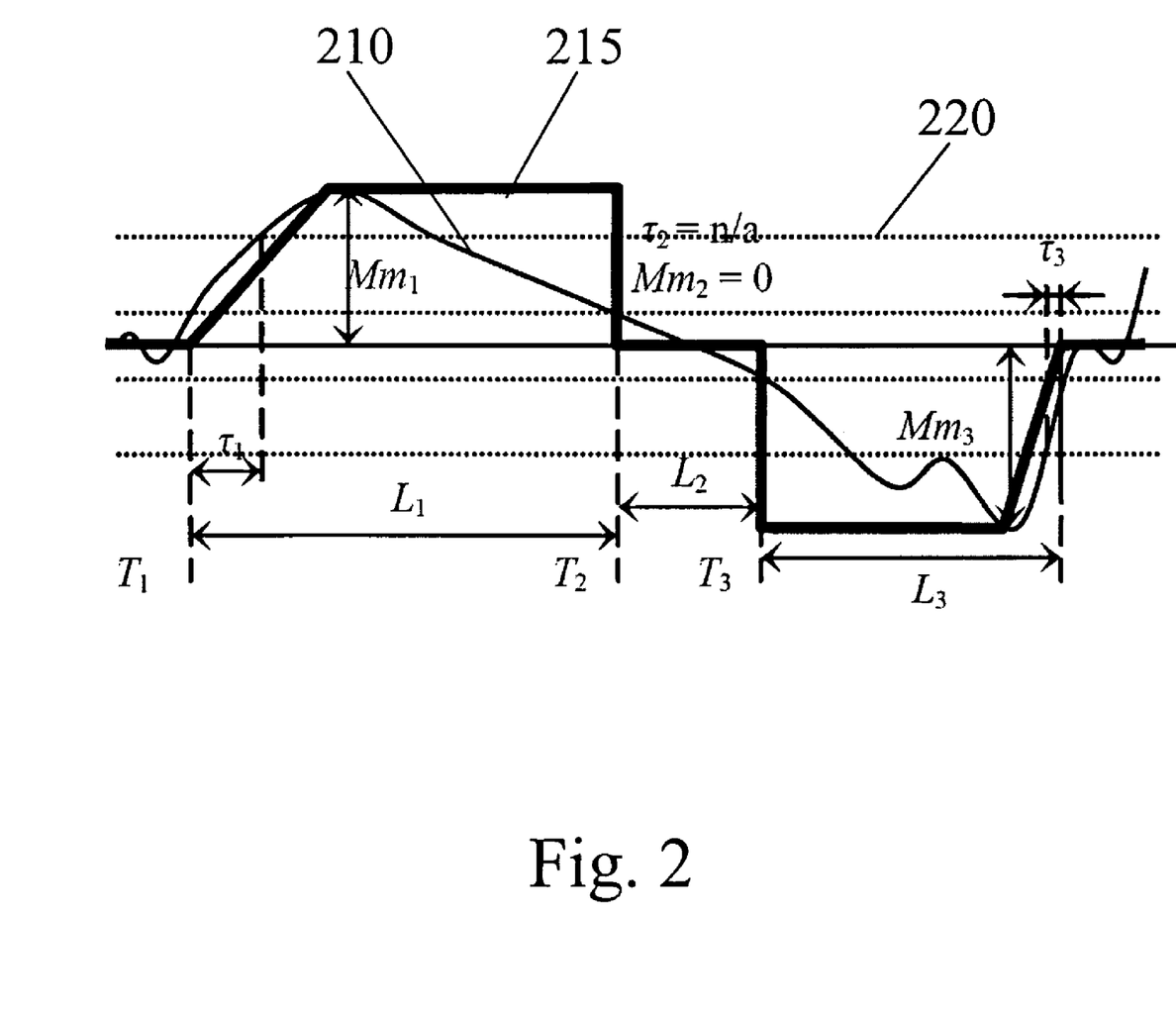
FIG. 2 shows a plot of zero crossing coding of an audio signal.

Specifically, the incoming raw acoustic signal sampled at 1 MHz is compressed using ZC coding. An interval between zero-crossings is coded by storing the start time of the interval ($T_j$), the length of the interval ($L_j$), the minimum or maximum signal value ($Mm_j$), the previous signal average amplitude (P) and the rise time ($\tau_j$) of the signal, where j=1, 2, 3, . . . . FIG. 2 shows ZC coding of an audio signal, where curve line 210 line show the original signal, curve line 215 represents the coded signal, while dashed lines 220 are comparison values. Characteristic features of both the shock wave and muzzle blast in the ZC domain are extracted using an extensive acoustic library of shots.

These features are used to detect possible occurrences of the shock wave and muzzle blast patterns in the coded signal stream. The time of arrival (hereinafter "TOA") of the detected acoustic event using the on-board clock is stored and the mote is notified. The MICA2 mote reads the measurement data, such as TOA and optionally signal characteristics, and performs time synchronization between its own clock and that of the acoustic board. The measured data is then propagated back to the base station using middleware services of the sensor network Sensor Fusion The sensor network of the present invention provides the arrival times of the acoustic signals to the base station. In one embodiment, the time difference of arrival (hereinafter "TDOA") solution of both the muzzle blast and the shockwave on every node is utilized. The TDOA of the acoustic signals of two sensors defines a hyperboloid surface. For ideal measurements, the intersection of the resulting surfaces computed using multiple pairs of sensor data gives rise to the exact source of a sound. Theoretically, four non-coplanar measurements are enough to get the three dimensional (hereinafter "3D") localization of the source of the sound. Since the speed of the sound depends on environmental conditions, an additional measurement point may be required [5].

Figure 3:
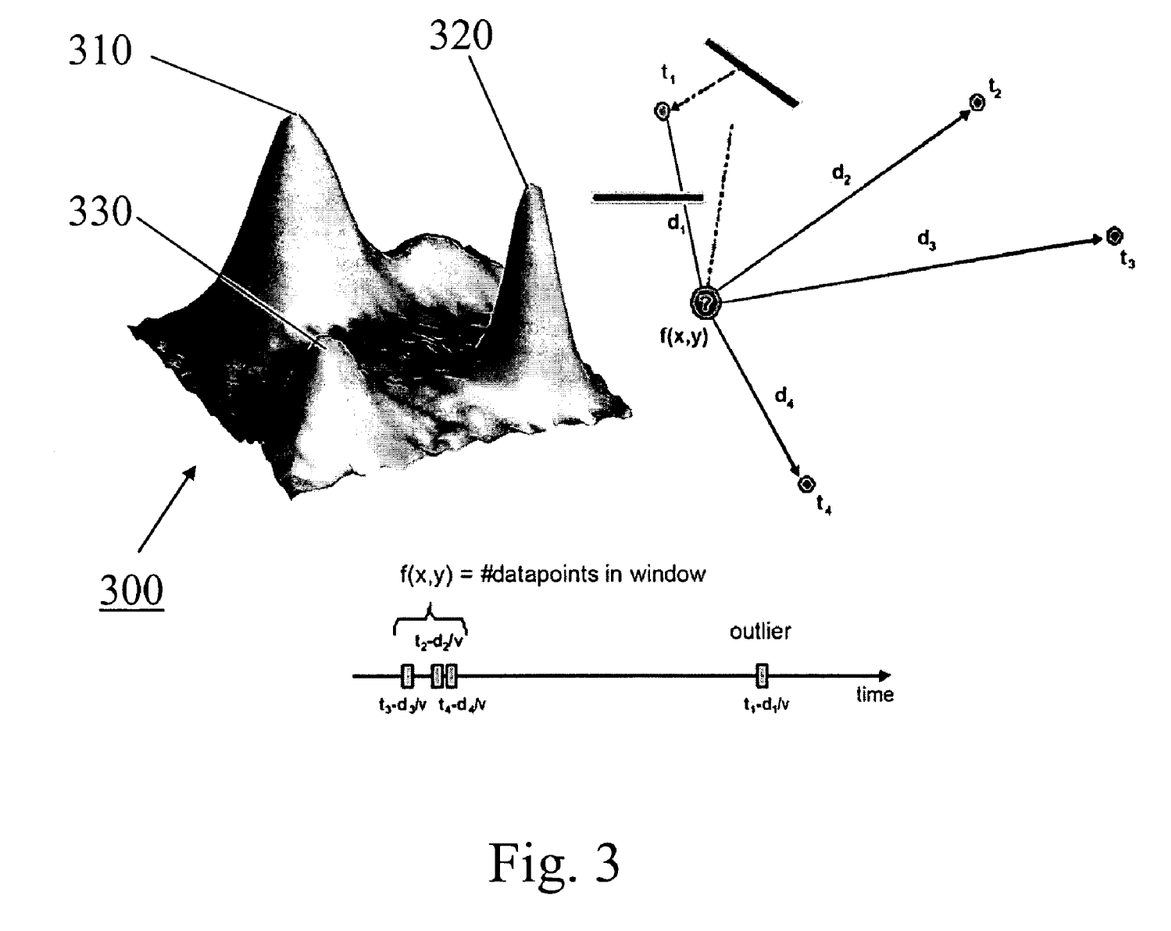
FIG. 3 shows a sensor fusion approach based on the time of arrival data according to one embodiment of the present invention.

In another embodiment, a sensor fusion algorithm based on the TOA measurements is implemented to locate the sources of one or more acoustic events. The sensor fusion algorithm is capable of locating positions of multi shooters at the same time, robust against localization and time synchronization errors, and effectively handles bad or multi-path measurements. The sensor fusion algorithm is basically a search in a three-dimensional consistency function. Referring to FIG. 3, the global maximum 310 of the consistency function 300 identifies a position which is close to the source position of an acoustic event, such as a shooter. Multiple gunshots at the same time result in multiple local maxima. For example, as shown in FIG. 3, positions of maxima 310, 320 and 330 of the consistency function 300 represent the locations of three gunshots, respectively.

Consistency Function

In one embodiment, let N be the number of the TOA muzzle blast measurements, and for each $i = 1, 2, \ldots, N$ let $(x_i, y_i, z_i)$ be the coordinates of the sensor node making the ith measurement and $t_i$ be the TOA of the detected muzzle blast. In this embodiment, no assumption that the sensors make only one measurement per shot is made, because some sensors may detect both a direct line of sight and a delayed echo. Also no assumption that the N measurements correspond to a single shot is made, as several shots may be fired in a few seconds during an urban combat. To find the positions of the sources of one or more acoustic events, such as the positions of one or more shooters, first a consistency function is determined on the four-dimensional space-time space, and its local maxima of the consistency function are searched, where the local maxima correspond to the location and time of possible shots. Then these local maxima are further analyzed to eliminate false positives caused by echoes of the one or more acoustic events.

For any hypothetical shooter position $(x, y, z)$ and shot time t, the theoretical TOA of the muzzle blast at the sensor that record the ith measurement is $$t_i(x, y, z, t) = t + [(x-x_i)^2 + (y-y_i)^2 + (z-z_i)^2]^{(1/2)}/v,$$

where v is the speed of the sound. If the ith measurement is a direct line of sight detection of this hypothetical shot, then the times $t_i(x, y, z, t)$ and $t_i$ must be equal. In practice, however, due to errors in sensor localization, time synchronization and signal detection, only the following inequality is satisfied $$|t_i(x, y, z, t) - t_i| \leq \tau, \tag{1}$$

where $\tau = \delta_1/v + \tau_2 + \tau_3$ is an uncertainty value, $\delta_1$ is the maximum localization error, $\tau_2$ is the maximum time synchronization error, $\tau_3$ is the maximum allowed signal detection uncertainty, and $\tau$ is determined by the localization error dominates. In one embodiment, it is assumed that an upper bound for $\tau$ is known based on an a priori evaluation of the self localization, the time synchronization and the signal detection algorithms. The consistency function $C_{96}(x, y, z, t)$ is defined as the number of measurements for which the inequality (1) holds:

$$C_\tau(x, y, z, t) = \text{count}(|t_i(x, y, z, t) - t_i| \leq \tau)|_{i=1, 2, \ldots, N}$$

The consistency function is an integer valued function and always less than or equal to N.

It is additive for the list of TOA measurements, and increasing in $\tau$. Although $C_{96}(x, y, z, t)$ is not continuous, it satisfies a crucial property utilized in the search algorithm:

$$C_{\tau/4}(x', y', z', t') \leq C_{96}(x, y, z, t) \tag{2}$$

whenever $|x-x'|/v, |y-y'|/v, |z-z'|/v,$ or $|t-t'| \leq \tau/2$.

The consistency function usually takes its maximum value not in a single point but also in a 4-dimensional area, called a max area. The size of the max area depends on $\tau$. If erroneous measurements are present, it is possible that there are more unconnected max areas, and it is also possible that the true location of the gunshot is not contained in the max area. A simple counterexample may easily be generated even for the ideal situation with $\tau=0$, M correct measurements and M−2 bad measurements, where the maximum consistency value becomes M+1, and the optimum is not at the true location.

In certain situations, multi-path effects may create strong local maxima (mirror effect), but based on empirical evaluation the uncertainty value $\tau$ must be higher for mirror images to reach the same $C_{96}(x, y, z, t)$ value.

Search Algorithm

The time complexity of finding the maxima of the consistency function in an interest area $[X_{min}, X_{max}] \times [Y_{min}, Y_{min}] \times [Z_{min}, Z_{max}]$ and in the appropriate time window $[T_{min}, T_{max}]$ is linear in terms of $X_{max}-X_{min}, Y_{max}-Y_{min}, Z_{max}-Z_{min}, T_{max}-T_{min}$, and N. Because of the inequality (2) it is enough to evaluate $C_{96/4}(x', y', z', t')$ at grid points of the search space with uniform distance $v\tau/2$ for the x, y and z coordinates and $\tau/2$ for t, and then finding the maxima among these points.

In one embodiment, a generalized Bisection method based on interval arithmetic is applied to find local and global maxima of the consistency function in an interest area. Interval arithmetic introduces algebraic operations on closed intervals that represent possible values of variables. Every algebraic expression, including the definition of the consistency function, is evaluated for intervals. For intervals $[x_{min}, x_{max}]$, $[y_{min}, y_{max}], [z_{min}, z_{max}],$ and $[t_{min}, t_{max}]$ the consistency function yields the interval $$[C_{96}^{min}, C_\tau^{max}] = C_\tau([x_{min}, x_{max}], [y_{min}, y_{max}], [z_{min}, z_{max}], [t_{min}, t_{max}])$$

that have the property that for every $x_{min} \leq x \leq x_{max}$, $y_{min} \leq y \leq y_{max}, z_{min} \leq z \leq z_{max}$ and $t_{min} \leq t \leq t_{max}$ $$C_\tau^{min} \leq C_\tau(x, y, z, t) \leq C_\tau^{max}.$$

The value $C_\tau^{min}$ is the number of measurements that satisfy the inequality (1) for certain points of the 4-dimensional rectangular region determined by $[x_{min}, x_{max}] \times \Lambda \times [t_{min}, t_{max}]$, while $C_\tau^{max}$ is the number of measurements that satisfy (1) for all points of the same region. During the search, a list of 4-dimensional rectangular regions ('boxes') is maintained, initially containing only $[X_{min}, X_{max}] \times [Y_{min}, Y_{max}] \times [Z_{min}, Z_{max}] \times [T_{min}, T_{max}]$, together with their evaluation under the consistency function. At each step, the region that has maximum $C_\tau^{max}$ value is removed from the list, and bisected into two equal parts along its longest dimension. Then the two resulting regions is inserted back to the list. This procedure is stopped when the size of the maximum region is less than $v\tau/2$ for the space and $\tau/2$ for the time coordinate. The resulting 4-dimensional region is guaranteed to contain at least one global maximum point of the consistency function $C_\tau(x, y, z, t)$. Note that there may be several boxes with the same $C_\tau^{max}$ value, usually covering a small area around the true location. When displayed, this area provides an easily understandable visual representation of the uncertainty region of the location estimate.

The consistency function may have several local maxima, resulting from echoes or multiple gunshots. The iterative application of the above search method with appropriate echo detection provides a powerful tool for simultaneous shooter localization. The algorithm is faster than the simple linear algorithm, which requires $N(X_{max}-X_{min})(Y_{max}-Y_{min})(Z_{max}-Z_{min})(T_{max}-T_{min})/(v^3\tau^4)$ computational steps. For example, for a 200×100×20 meter urban area with a 2-second time window and an uncertainty value of about 0.3 milliseconds and about 30 TOA measurements, this requires to $8 \times 10^{13}$ computational steps for the linear algorithm to find the local and global maxima. However, the generalized Bisection method may find the local and global maxima in less than $10^5$ computational steps.

RESULTS

Figure 4:
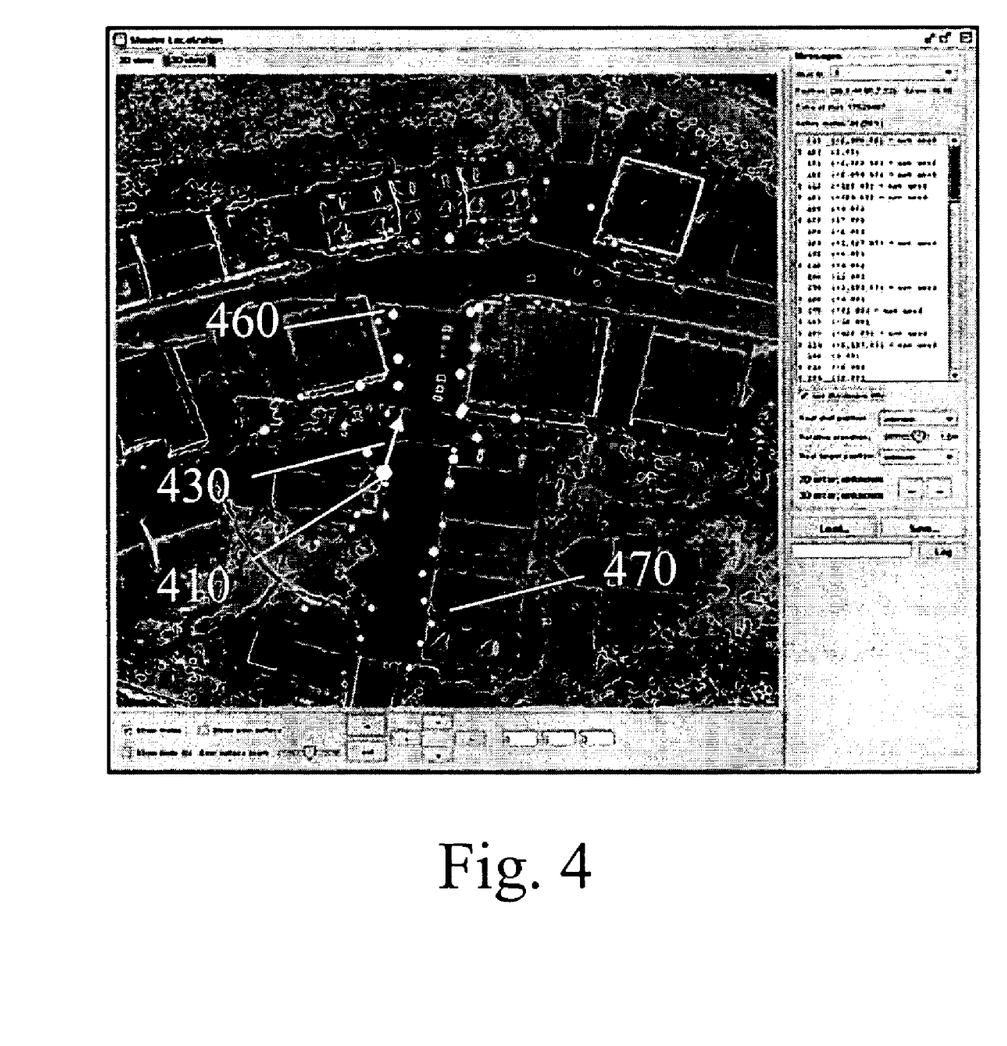
FIG. 4 shows a top view of a system deployed in a protecting area according to one embodiment of the present invention.

The real-time performance of the invented system was conducted in a series of field trials in the McKenna Military Operations on Urban Terrain (hereinafter "MOUT") training facility in Fort Benning, Ga. The system setup utilized 56 motes deployed in the central area of the McKenna village as shown in FIG. 4, a screen dump of the system graphical user interface that includes an overhead picture of the MOUT site. The estimated position of the shooter is shown in FIG. 4 by a large circle 410, while the direction of the shot is indicated by an arrow 430. Other circles 460 and 470 indicate the sensor positions where medium sized ones 460 denote sensor locations whose data were utilized in the current location estimation.

For error analysis purposes, 20 different known shooter positions were used in the experiment. During the performance, 171 gun shots were fired, where 101 gun shots were blanks and 70 gun shots were with short range training ammunitions (hereinafter "SRTA"). Since the performance of the system was similar for both types of ammunition, only the unified results are presented.

Figure 5:
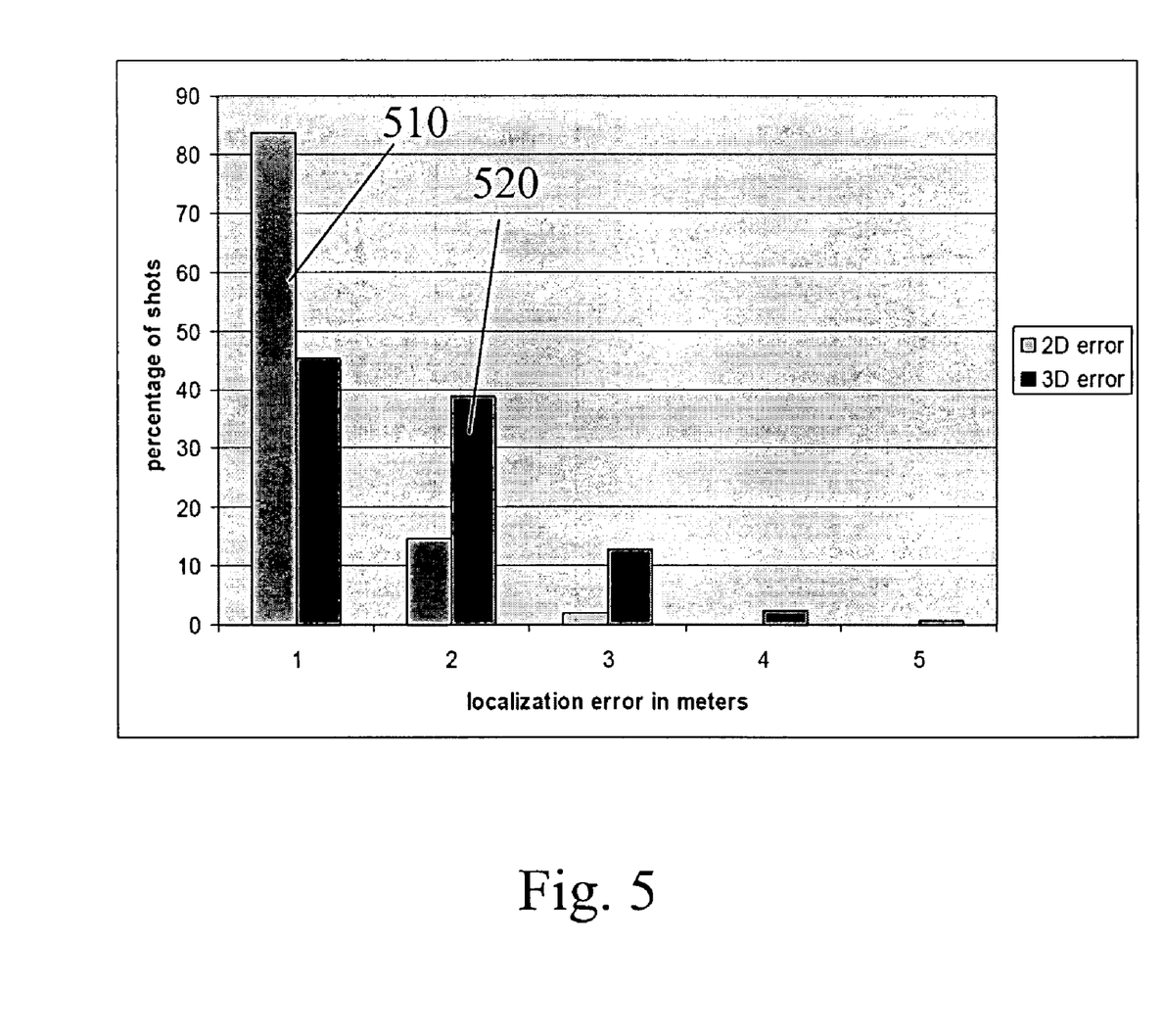
FIG. 5 shows a histogram of localization accuracy in 3D and 2D according to one embodiment of the present invention.

The shooter localization error of the invented system is shown in FIG. 5, where a 3D error 510 is a total localization error, while in a two-dimensional (hereinafter "2D") error 520 the elevation information is omitted. As shown in FIG. 5, the system accuracy in 2D is better than that in 3D. The average 2D error of localization of the shooter was about 0.6 meters, among them, 83% of the shots had less than one meter, and 98% of the shots had less than 2 meters of error. The elevation detection was not as accurate because the sensors were mostly positioned on the ground, approximately in a plane. There were only a few sensors located on rooftops or window ledges. This lack of variation in the sensor node elevation resulted in the 3D accuracy being worse than the 2D accuracy.

This could be significantly improved by locating a larger fraction of the sensor nodes in elevated positions. As shown in FIG. 5, 46% of the shots had less than 1 m, and 84% of shots had less than 2 m in position error in 3D. The average 3D error was ammeter 1.3 meters.

The present invention, among other things, discloses a system for locating the shooter localization by utilizing a sensor network to gather acoustic information in the selected area. The sensor network utilizes MICA2 motes and custom acoustic sensor boards to measure the time of arrival of shock waves and muzzle blasts. The measurements are propagated through the sensor network to the base station where the fusion algorithm estimates the location of the shooter, along with the trajectory of the supersonic projectile.

The foregoing description of the exemplary embodiments of the invention has been presented only for the purposes of illustration and description and is not intended to 25 be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCE LIST

1. Duckworth et al., 1996, Acoustic counter-sniper system, *Proc. of SPIE International Symposium on Enabling Technologies for Law Enforcement and Security*,
2. Gay et al., 2003, The nesC Language: A Holistic Approach to Networked Embedded Systems, *Proc. of PLDI*.
3. Hill et al., 2000, System Architecture Directions for Networked Sensors, *Proc. of ASPLOS, 2000*.
4. Lupu et al., 2002, Speaker Verification Rate Study Using the TESPAR Coding Method, *Proc. of COST 276 Workshop on Information and Knowledge Management for Integrated Media Communication*.
5. Mahajan and Walworth 2001, 3-D Position Sensing Using the Differences in the Time-of-Flights from a Wave Source to Various Receivers, *IEEE Transactions On Robotics and Automation*, Vol. 17, No. 1, pp. 91-94.
6. Stoughton, 1997, Measurements of Small Caliber Ballistic Shock Waves in Air, *JASA* 102 (2), Part 1.
7. Vick et al., 2000, Aerospace Operations in Urban Environments: Exploring New Concepts, *RAND* MR-1187.
8. Kusy et al., 2004, Flooding Time Synchronization, *Technical Report*, Institute for Software Integrated Systems, Vanderbilt University.
9. Maroti, 2004, Directed Flood-Routing Framework, *Technical Report*, Institute for Software Integrated Systems, Vanderbilt University.

What is claimed is:

1. A method for locating an acoustic source from an acoustic event of the acoustic source, comprising the steps of:
   a. deploying a sensor network having a plurality of spatially separated sensor nodes, each spatially separated sensor node having a unique node ID and located in a predetermined position encountering acoustic waves generated by an acoustic event passing proximate to the plurality of spatially separated sensor nodes;

b. synchronizing the plurality of spatially separated sensor nodes of the sensor network to a common time base;

c. obtaining information of the acoustic waves from each of the plurality of spatially separated sensor nodes when the acoustic event is detected, the information of the acoustic waves including the time of arrival of the acoustic waves at the corresponding sensor node;

d. broadcasting the obtained information of the acoustic waves from each of the plurality of spatially separated sensor nodes through the sensor network to a base station;

e. receiving the broadcasted information of the acoustic waves from the sensor network by the base station; and f. processing the received information of the acoustic waves so as to locate the acoustic source of the acoustic event in the base station, wherein the synchronizing step is performed with a flooding time synchronization protocol.

2. The method of claim 1, wherein the plurality of spatially separated sensor nodes communicates each other wirelessly.

3. The method of claim 1, wherein each of the plurality of spatially separated sensor nodes comprises a mote and an acoustic sensor board in communication with the mote.

4. The method of claim 3, wherein the acoustic sensor board comprises at least one acoustic sensor.

5. The method of claim 1, wherein the flooding time synchronization protocol comprises the steps of:

a. electing a node from the plurality of spatially separated sensor nodes as a root node at starting time of the sensor network to which the rest of the plurality of spatially separated sensor nodes will be synchronized;

b. periodically broadcasting a message by the root node to nodes within a broadcast radius of the root node, the message containing a root ID, a sequence number and a time stamp, the root ID being the unique node ID of the root node, the sequence number being a monotonically increased unique ID generated by the root node, the time stamp being the globe time known by the root node at the time of message transmission;

c. recording its own local time when receiving the broadcasted message so as to have a reference point with an estimate of the global time along with its own local time for each of the nodes within the broadcast radius of the root node if the sequence number for the broadcasted message is higher than the highest sequence number stored in a reference table in the corresponding node;

d. synchronizing each of the nodes by updating its reference table with the reference point, and the sequence number and the current root ID;

e. re-broadcasting the message using its highest sequence number and the current root ID by the synchronized node to nodes within a broadcast radius of the synchronized node so as to synchronize the nodes;

f. repeating steps (b)-(e) to synchronize the sensor network to the root node; and g. re-electing a root node if a node does not received a message for a predetermined period of time.

6. The method of claim 1, wherein the acoustic wave comprises a shock wave.

7. The method of claim 1, wherein the base station comprises a computer.

8. A method for locating an acoustic source from an acoustic event of the acoustic source, comprising the steps of:

a. deploying a sensor network having a plurality of spatially separated sensor nodes, each spatially separated sensor node having a unique node ID and located in a predetermined position encountering acoustic waves generated by an acoustic event passing proximate to the plurality of spatially separated sensor nodes;

b. synchronizing the plurality of spatially separated sensor nodes of the sensor network to a common time base;

c. obtaining information of the acoustic waves from each of the plurality of spatially separated sensor nodes when the acoustic event is detected, the information of the acoustic waves including the time of arrival of the acoustic waves at the corresponding sensor node;

d. broadcasting the obtained information of the acoustic waves from each of the plurality of spatially separated sensor nodes through the sensor network to a base station;

e. receiving the broadcasted information of the acoustic waves from the sensor network by the base station; and f. processing the received information of the acoustic waves so as to locate the acoustic source of the acoustic event in the base station, wherein the broadcasting step is performed with a directed flood-routing framework engine.

9. The method of claim 8, wherein the directed flood-routing framework engine performs the steps of:

a. creating a flooding policy that defines a direction of flooding and a way of which intermediate neighboring nodes re-broadcast messages;

b. keeping recently received data packets in a table together with their priority that is managed by the flooding policy;

c. periodically selecting the data packets with the highest priority;

d. packing the selected data packets into a single radio message; and e. broadcasting the packed data packets to the neighboring nodes.

10. A method for locating an acoustic source from an acoustic event of the acoustic source, comprising the steps of:

a. deploying a sensor network having a plurality of spatially separated sensor nodes, each spatially separated sensor node having a unique node ID and located in a predetermined position encountering acoustic waves generated by an acoustic event passing proximate to the plurality of spatially separated sensor nodes;

b. synchronizing the plurality of spatially separated sensor nodes of the sensor network to a common time base;

c. obtaining information of the acoustic waves from each of the plurality of spatially separated sensor nodes when the acoustic event is detected, the information of the acoustic waves including the time of arrival of the acoustic waves at the corresponding sensor node;

d. broadcasting the obtained information of the acoustic waves from each of the plurality of spatially separated sensor nodes through the sensor network to a base e. receiving the broadcasted information of the acoustic waves from the sensor network by the base station; and f. processing the received information of the acoustic waves so as to locate the acoustic source of the acoustic event in the base station, wherein the processing step is performed with a sensor fusion algorithm, wherein the sensor fusion algorithm comprises the steps of:

(a). defining a consistency function from the obtained information of the acoustic waves and positions of the corresponding sensor nodes;

(b). finding a maximum of the consistency function; and (c). identifying a location of the maximum of the consistency function as the location of the acoustic source of the acoustic event, wherein the consistency function is configured such that the consistency function automatically classifies and eliminates erroneous measurements and multi-path effects.

* * * * *

UNITED STATES PATENT AND TRADEMARK OFFICE
CERTIFICATE OF CORRECTION

| | |
|---|---|
| PATENT NO. | : 7,433,266 B2 |
| APPLICATION NO. | : 11/227446 |
| DATED | : October 7, 2008 |
| INVENTOR(S) | : Ákos Lédeczi et al. |

It is certified that error appears in the above-identified patent and that said Letters Patent is hereby corrected as shown below:

Column 1, Line 34, the first numeral of the Government contract number should be changed from "7" to -F-. Accordingly, the Government contract number should read as F33615-01-C-1903.

Signed and Sealed this

Twentieth Day of January, 2009

JON W. DUDAS
*Director of the United States Patent and Trademark Office*